United States Patent
Siegel

(10) Patent No.: US 6,288,996 B1
(45) Date of Patent: *Sep. 11, 2001

(54) TICKET/PASS FORMED OF A CUT OPTICAL DISK AND PROCESS OF FORMING AND SYSTEM OF USE

(75) Inventor: Alan Siegel, Orlando, FL (US)

(73) Assignee: Shape CD, Inc., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/275,178

(22) Filed: Mar. 24, 1999

(51) Int. Cl.[7] .............................. G11B 3/70; G11B 5/84; G11B 7/26
(52) U.S. Cl. ........................................................... 369/273
(58) Field of Search .................................. 369/273, 280, 369/272

(56) References Cited

U.S. PATENT DOCUMENTS

| D. 421,427 | * | 3/2000 | Siegel | D14/114 |
|---|---|---|---|---|
| D. 426,203 | * | 6/2000 | Siegel | D14/114 |
| 1,399,757 | * | 12/1921 | Emerson | 369/273 |
| 1,479,847 | * | 7/1924 | Widmann | 264/107 |
| 3,039,218 | * | 6/1962 | Whiting et al. | 40/340 |
| 3,761,687 | * | 9/1973 | Swett et al. | 235/440 |
| 3,798,422 | * | 3/1974 | Foret et al. | 360/2 |
| 4,703,165 | * | 10/1987 | Colodner et al. | 235/487 |
| 4,988,853 | * | 1/1991 | Nagashima et al. | 235/475 |
| 5,479,796 | * | 1/1996 | Shimano | 63/2 |
| 5,882,555 | * | 3/1999 | Rohde et al. | 264/1.33 |
| 6,016,298 | * | 1/2000 | Fischer | 369/75.1 |
| 6,078,557 | * | 6/2000 | Pierson | 369/273 |

FOREIGN PATENT DOCUMENTS

M 95 02 679 * 9/1995 (DE).
2284404 A * 6/1995 (GB).

* cited by examiner

*Primary Examiner*—Brian E. Miller
*Assistant Examiner*—Julie Anne Watko
(74) *Attorney, Agent, or Firm*—McGlew and Tuttle, P.C.

(57) ABSTRACT

A cut optical disk is provided. The optical disk includes a data region which may be read by and optical disk reader (CD/CD-ROM/DVD reader). Ticket/pass information as well as anti-counterfeit feature may be provided in a graphics region or in the data region or both. The data region may be provided with audio and/or video data. The data region may also have multimedia presentations which may be presented on a personal computer or through a DVD reader etc. The data region may also have data which is read for gaining access to the event or facility. The graphics region also may have machine readable features such as bar codes. Additionally, most printing techniques may be used in the graphics region to provide information and aesthetic attributes and attributes to avoid counterfeit problems. The cut optical disk includes a standard central opening (of a CD/CD-ROM/DVD type). The data region is provided in a region around the central opening. The data region may be on both sides of the disk. Graphics regions may be provided on both sides of the disk as well. The invention also includes a process for forming the disks and for using passes/tickets.

15 Claims, 4 Drawing Sheets

TICKET/PASS FORMED OF A CUT OPTICAL DISK AND PROCESS OF FORMING AND SYSTEM OF USE

FIELD OF THE INVENTION

The invention relates generally to tickets and passes for events and gaining access to facilities and more particularly to tickets formed of cut optical disks.

BACKGROUND OF THE INVENTION

Tickets have been used for many years for access to events such shows, concerts, sporting events etc. Elaborate techniques have recently been used to avoid counterfeit tickets from being used. Printing techniques as well as the use of magnetic material and embedded machine readable features have also been used. The techniques can result in a very expensive ticket. The techniques, apart from the appearance of the graphics, add very little value to the ticket.

The same type of problems exist with regard to passes. Passes are used for events and also to gain special access to an event or facility. Passes are typically worn around the users neck in a lanyard manner. Passes may be provided with features to avoid counterfeit problems. Passes may have machine readable (bar codes etc.) features. Techniques to avoid counterfeit passes often do not result in more desirable or more appealing pass.

SUMMARY AND OBJECTS OF THE INVENTION

It is an object of the invention to provide a ticket or pass which has features to avoid counterfeit problems and which also provides a useful and valuable memento for the holder of the pass or ticket.

According to the invention, the cut optical disk is provided. The optical disk includes a data region which may be read by an optical disk reader (CD/CD-ROM/DVD reader). Ticket/pass information as well as anti-counterfeit features may be provided in a graphics region or in the data region or both.

The data region may be provided with audio and/or video data. The data region may also have multimedia presentations which may be presented on a personal computer or through a DVD reader etc. The data region may also have data which is read for gaining access to the event or facility. The graphics region also may have machine readable features such as bar codes. Additionally, most printing techniques may be used in the graphics region to provide information and aesthetic attributes and attributes to avoid counterfeit problems.

The cut optical disk includes a standard central opening (of a CD/CD-ROM/DVD type). The data region is provided in a region around the central opening. The data region may be on both sides of the disk. Graphics regions may be provided on both sides of the disk as well.

The invention also includes a process for forming the disks and for using passes/tickets including providing an optical disk with data regions and graphics regions and cutting the optical disk to provide a ticket. One of the data region and graphics region has information to provide a distinguishable ticket/pass. The ticket is subsequently distributed along with other substantially similar tickets. The tickets are then inspected for admission to an event or facility.

The process may also include cutting a breakaway tab structure including cutting holes in the ticket. A tab region is preferably provided on one side of the holes allowing the tab to be broken away from the remainder of the ticket. Such a tab is subsequently collected to monitor admission to be events or facility. The tab region may have graphics that are different then the remainder of the ticket. The tab region may have a bar code or number for use in monitoring access to the event or facility. The tab region may also have a data region (on either or both sides)

The process preferably also includes cutting an opening in the ticket to allow the ticket to be suspended on a lanyard.

According to a further feature of the process the data regions are provided with audio including music and/or spoken information. The data region also may include video and/or multimedia material. Various formats may be used including various file formats (MPEG, JPEG, TIFF, GIFF etc.) as well as optical data formats (CD, CD-ROM, DVD, mini disk, etc.).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
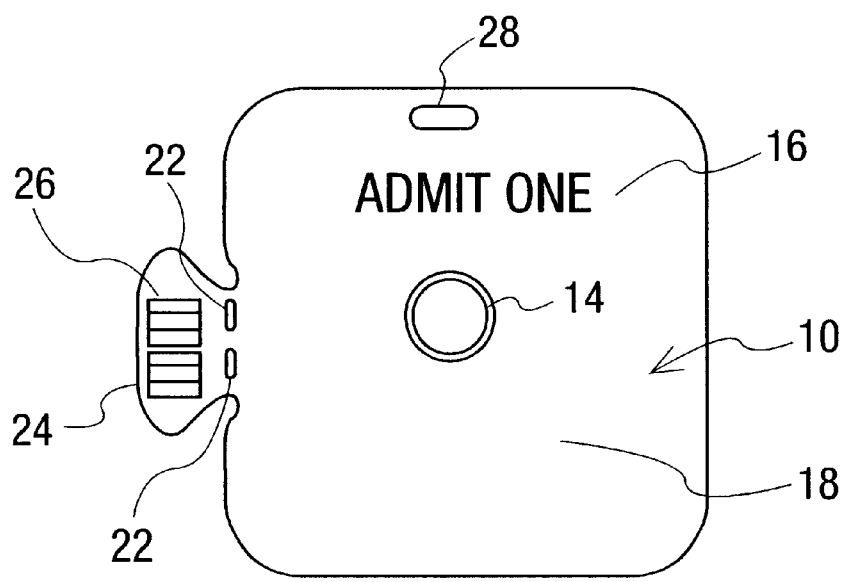

Referring to the drawings in particular, the invention comprises a ticket or pass generally designated 10. The ticket and is an optical disk with cut ages 12. The disk includes a central opening 14, of the type used for the CD/CD-ROM/DVD formats and also other optical disk formats such as the mini disk format. The ticket 10 has a data region 18. A data region 18 may be provided on both sides of ticket 10. The data is preferably provided in a format which can be read by a CD or CD-ROM or DVD reader. The data may be provided and other formats as well. Various file types may be used to provide the data in the data region 18. The disk also has a graphics region 16. The graphics region may be provided on all or a part of each side of the ticket 10. One side of the ticket 10 may also have no graphics whatsoever if this is desired. FIG. 2 shows an alternate embodiment of the invention. The ticket 10 includes a central opening 14 and is cut to provide cut edges 12. A data region 18 is again provided. The graphics region 16 is also provided. The cut edges 12 form a tab region 24. This is preferably an extension from the general shape of the ticket 10. The tab region 24 is provided as a breakaway tab by cutting holes 22 in ticket 10. This provides a weakening of the structure for breaking away that tab region 24. The tab region 24 may have a special graphics region 26. This can include a number but it may also be machine readable such as in the form of a bar code. The tab region may also have a special data region 18. The ticket 10 also includes an opening 28. This may be used for a lanyard, which is connected through opening 28.

Figure 1:
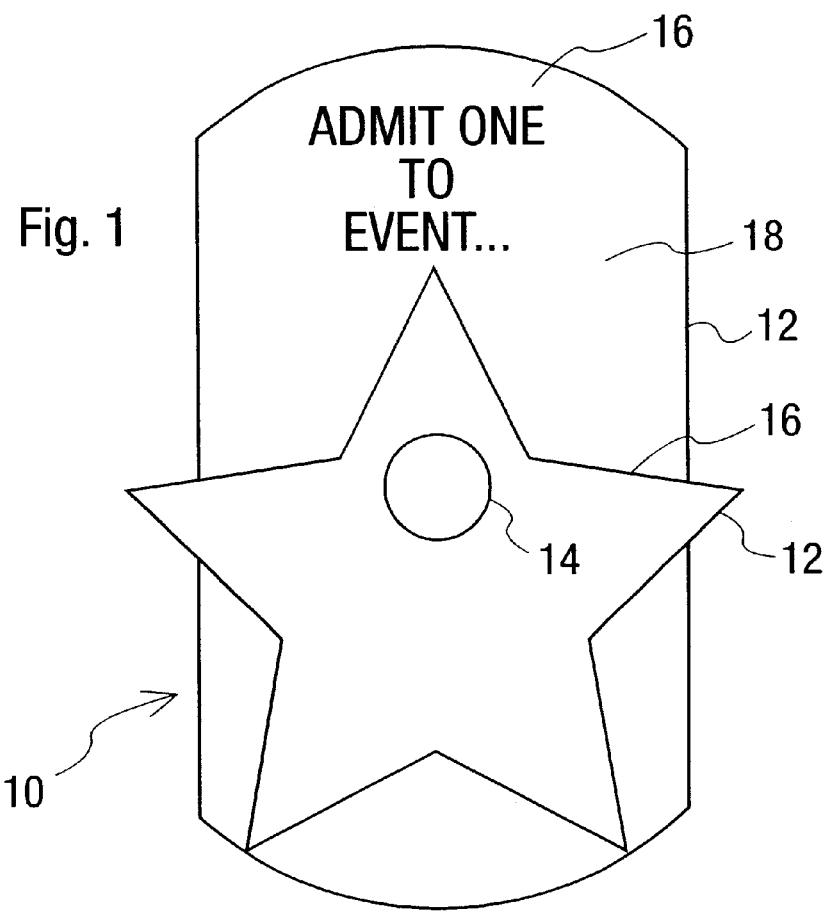
FIG. 1 is a top view showing and optical disk ticket/pass according to the invention; a FIG. 2 is a top view of an alternate embodiment of the invention.
Figure 3:
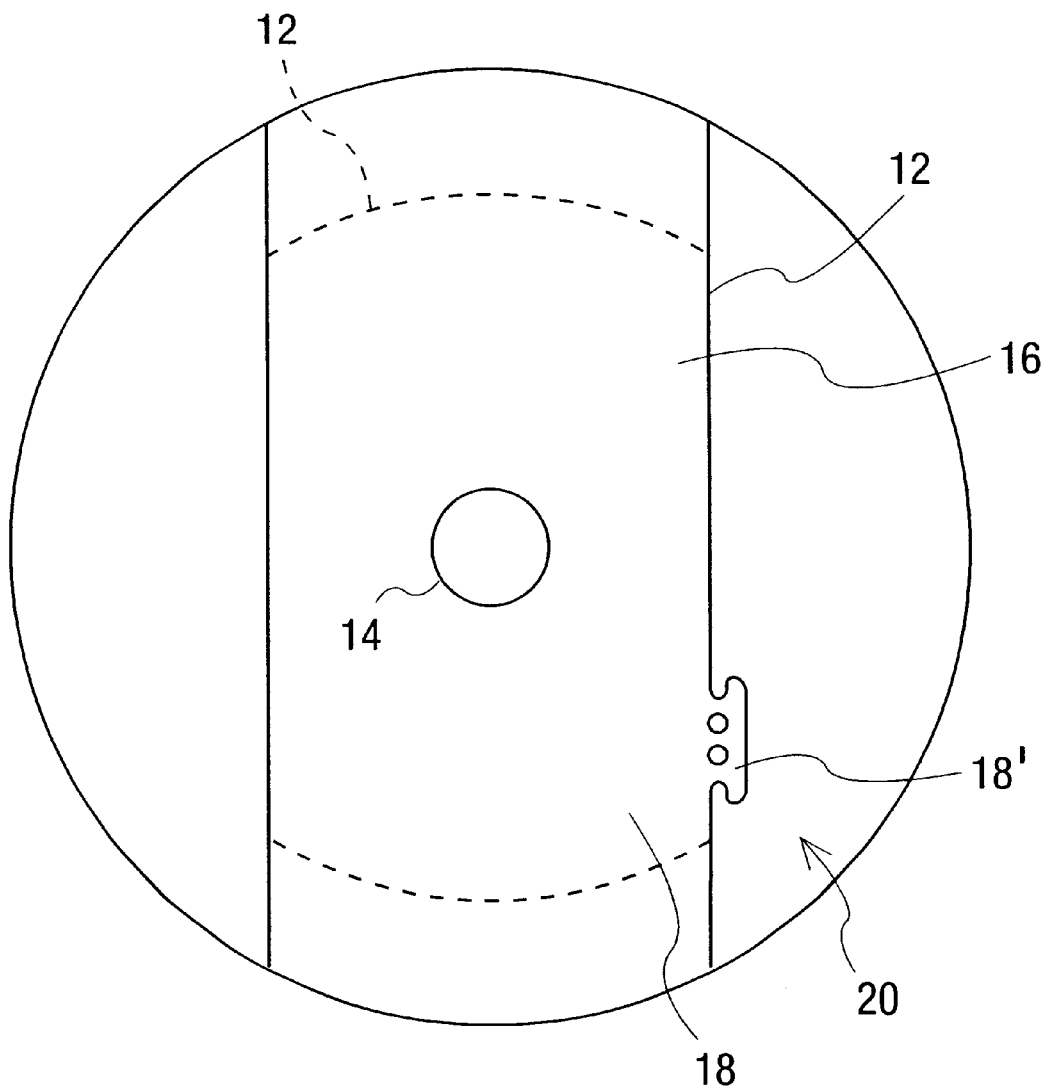
FIG. 3 is a top view of an optical disk prior to being cut to form the ticket/pass according to the invention.

FIG. 3 shows generally a disk 20. The disk 20 is formed with graphics regions 16 as well as data regions 18. Only graphics regions and data regions within a cut perimeter for edges 12 will be on the final ticket 10. The data region 18 may be on either or both sides of the disk 20, within the perimeter that will form edges 12. The edges 12 may provide various shapes to the final card 10. The shapes that the edges 12 form are preferably coordinated with the graphics region 16. The coordination of the cut edges 12, which form the perimeter and the graphics attributes (a star) is shown in FIG. 1. The contour may correspond with the outline of lettering, or of the shape of a thing (guitar, star, etc.).

Preferably before cutting the compact disk 20 to the shaped perimeter based on edges 12, data is provided on the compact disk 20. Data areas 18 of standard compact disk formats may be used. However, burning data into the compact disk should occur with information disposed on a final data area 18 of the disk based on the final ticket/pass shape. Data provided in other regions will not be read in the final shape 14 of the FILE BUSINESS CARD 20.

The amount of data that is available for the ticket/pass 10 depends on the size of the final ticket/pass 10. As various sizes and shapes are possible, the overall radius and the relationship to the data must be kept in mind by the designer. The relationship between the radius and the amount of data that can be stored in the data region is as indicated in table 1. Music Storage Capacity based on Radius

TABLE 1

| Minutes | Mega Bytes | Radius Minimum | Minutes | Mega Bytes | Radius Minimum |
|---|---|---|---|---|---|
| 0 | 0.00 | 28.00 mm | 26 | 239.62 | 42.70 mm |
| 1 | 9.22 | 28.72 mm | 27 | 248.83 | 43.16 mm |
| 2 | 18.43 | 29,42 mm | 25 | 258.05 | 43.61 mm |
| 3 | 27–65 | 30.11 mm | 29 | 267.26 | 44.06 mm |
| 4 | 36.86 | 30.77 mm | 30 | 276.48 | 44.50 mm |
| 5 | 46.08 | 31.42 mm | 31 | 286.70 | 44.94 mm |
| 6 | 55.30 | 32–06 mm | 32 | 294.91 | 45–38 mm |
| 7 | 64.51 | 32.68 mm | 33 | 304.13 | 46.50 mm |
| 8 | 73.73 | 33.29 mm | 34 | 313.34 | 46.23 mm |
| 9 | 82.94 | 33.89 mm | 35 | 322.56 | 46.65 mm |
| 10 | 92.16 | 34.48 mm | 36 | 331.78 | 47.07 mm |
| 11 | 101.38 | 35.05 mm | 37 | 340.99 | 47.48 mm |
| 12 | 110.59 | 35.62 mm | 35 | 350–21 | 47.69 mm |
| 13 | 119.81 | 36.17 mm | 39 | 369.42 | 48.30 mm |
| 14 | 129–02 | 36.72 mm | 40 | 368.64 | 46.70 mm |
| 15 | 138.24 | 37.26 mm | 41 | 377.86 | 49.10 mm |
| 16 | 147.46 | 37.79 mm | 42 | 387.07 | 49.49 mm |
| 17 | 156.67 | 38.31 mm | 43 | 396.29 | 49.88 mm |
| 18 | 165.89 | 38.83 mm | 44 | 405.50 | 50.27 mm |
| 19 | 175.10 | 39.33 mm | 45 | 414.72 | 50.66 mm |
| 20 | 184.32 | 39.83 mm | 46 | 423.94 | 61.04 mm |
| 21 | 193.64 | 40.38 ran | 47 | 433.15 | 51.42 mm |
| 22 | 202.75 | 40.81 mm | 45 | 442.37 | 51.80 mm |
| 23 | 211.97 | 41.29 mm | 49 | 451.58 | 52.17 mm |
| 24 | 221.18 | 41.77 mm | 50 | 460.80 | 62.54 mm |
| 25 | 230.40 | 42.24 mm | 51 | 470.02 | 52.91 mm |

Figure 4A:
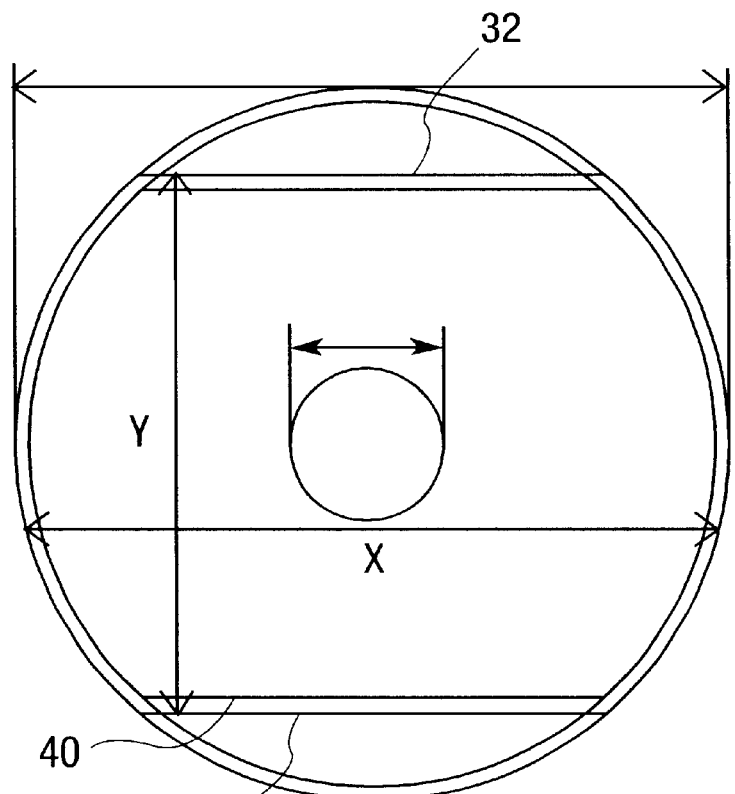
FIG. 4A is a top view showing X and Y dimensions with varying Y dimensions formed by upper and lower cuts.

FIG. 4A shows the relationship between the distance of cut edges 32 and 34 while the edges in the X direction are maintained at or near be maximum standard CD distance. The amount of data available for various Y dimensions with X being held constant is presented in Table 2.

TABLE 2

|  | X | Y | Megs | Audio |
|---|---|---|---|---|
| 1. | 80 mm | 62.54 mm | 36.86 | 4 min. |
| 2. | 80 mm | 61.22 mm | 27.65 | 3 min. |
| 3. | 50 mm | 59.84 mm | 18.43 | 2 min. |
| 4. | 80 mm | 58.44 mm | 9.22 | 1 min. |

Figure 4B:
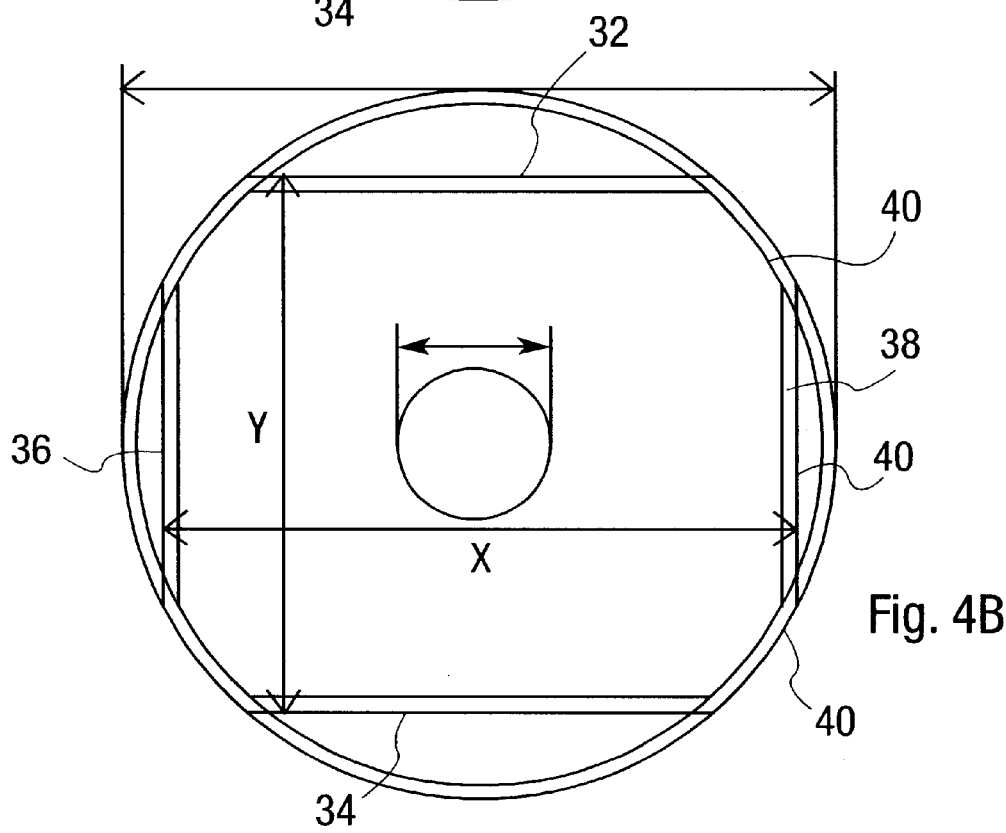
FIG. 4B is a top view showing X and Y dimensions with varying X and Y dimensions formed by upper and lower cuts as well as cuts on each side.

FIG. 4B shows the relationship between the distance of cut edges 32 and 34 as well as the distance between cut edges 36 and 38. Table 3 shows the amount of data available in the data region 18 for various X and Y dimension. The 1 mm boarder shown in FIGS. 4a and 4B is designated 40 and is not printed on.

TABLE 3

|  | X | Y | Megs | Audio |
|---|---|---|---|---|
| 1. | 75 mm | 62.54 mm | 36.86 | 4 min. |
| 2. | 70 mm | 61.22 mm | 27.65 | 3 min. |
| 3. | 65 mm | 59.84 mm | 18.43 | 2 min. |
| 4. | 60 mm | 58.44 mm | 9.22 | 1 min. |
| 5. | 75 mm | 58.44 mm | 9.22 | 1 min. |

The process of forming the ticket/pass 10 includes providing an optical disk. This may be a standard CD. This has a 120 mm diameter with a 118 mm diameter silver printable area. The center hole is 15 mm with a center 17 mm diameter non printable area. The process includes using a machine controlled cutting laser to shape cut the ticket/pass out of the original CD. According to a preferred process, an area is shape cut into a circular shape to provide an 80 mm diameter disk with a 78 mm diameter printing region (less the 17 mm diameter non printing region at the center). The thickness remains the same as the original disk (e.g. 1.125 mm). Additional cuts 32, 34, 36 and 38 may be provided to produce the edges 12 to define the perimeter. These are shown in FIGS. 4A and 4B. The area may be set (increase or decrease from minimum) with the playable area (data region) or the perimeter shape that is desired. The corners may be convex or squared-off depending upon the style and shape desired. Although many possibilities are available as to the shape of the final perimeter, the shape is preferably balanced and even more preferably symmetrical as to at least one axis.

Many possibilities are provided by the data region 18 and the graphics regions 16 according to the invention. The transfer media (e.g. the source of the original data) may be for example: SYQUEST 44/88/200/270 Meg; CD-Rom; IOMEGA ZIP; modem or e-mail; IOMEGA JAZZ; and floppy disk (3.5"). The applications may include for example: ADOBE ILLUSTRATOR; QUARK XPRESS; MACROMEDIA FREEHAND; ADOBE PAGEMAKER; ADOBE PHOTOSHOP; COREL DRAW; etc. The PC Formats include: PROCESS COLORS: EPS; PSD or TIFF; SPOT COLORS: FREEHAND or ILLUSTRATOR; COREL documents: export as an EPS.ai file with fonts converted to curves. MACINTOSH formats include: EPS;.PICT, OR TIFF and any format from the applications—listed above. The resolution may be for example vector format: (ILLUSTRATOR and FREEHAND EPS or COREL EPS.ai); pixel format: EPS, PICT, or TIFF at 170 dpi or higher for CD label 300 dpi or higher for traycards and other printed material. The graphic specifications may be based on files (fonts, placed files, etc, note: PC users should convert fonts to curves) with an indication of the total playing time of the disc.

Figure 5:
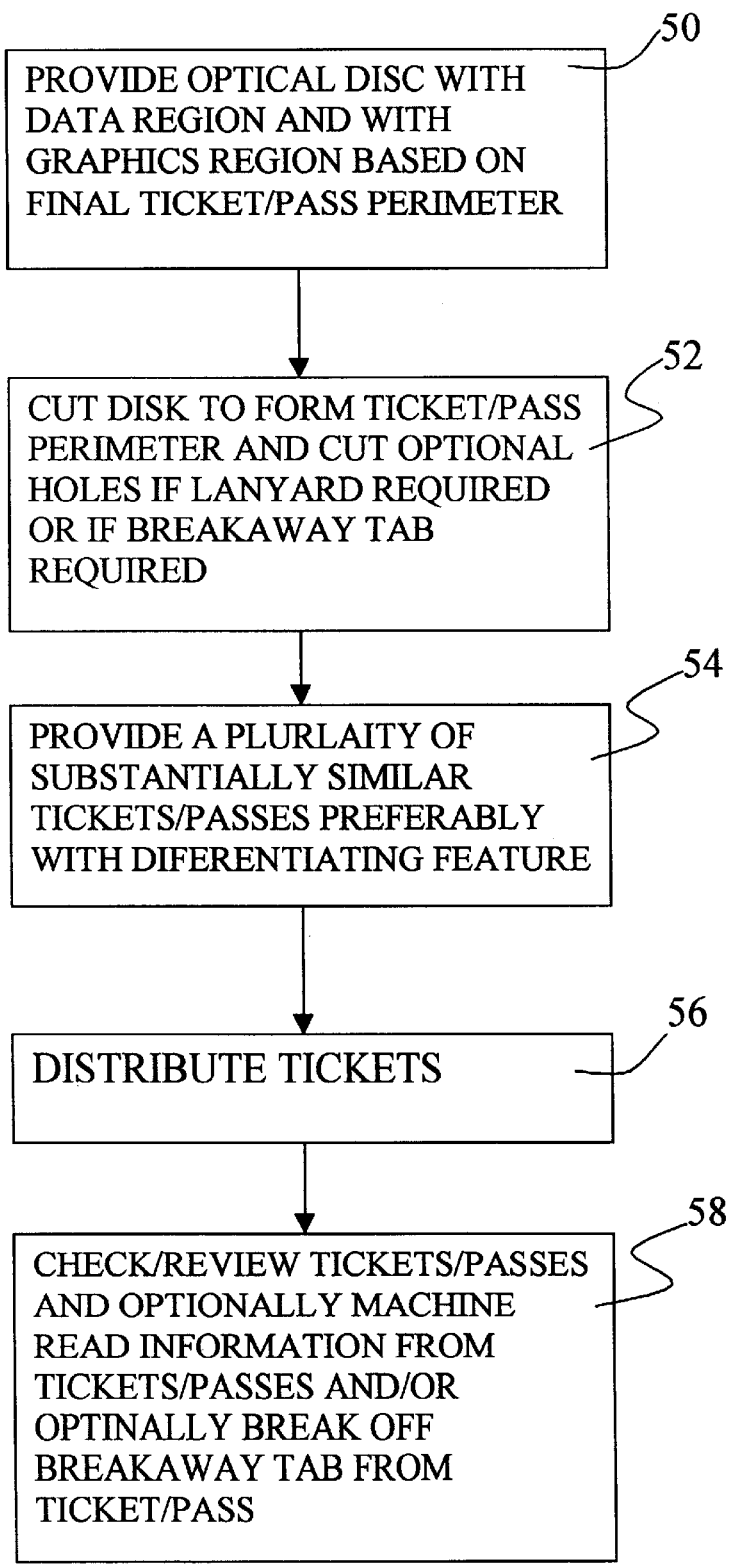
FIG. 5 is a diagram showing system process steps according to the invention.

FIG. 5 is a diagram showing the various steps involved in the system and process according to the invention. At 50 an optical disk is provided with one or more data region and one or more graphics region. The disk is cut at 52 to form a basic ticket or pass 10. The ticket are passed 10 is cut to have edges defining a ticket perimeter. The perimeter may be adapted to correspond to the graphics regions. The cutting process may also include forming a tab and forming openings to provide the tab as breakaway tab. Additionally, an opening may be provided such that the ticket may be hung around the neck of the ticket/pass holder. The tab may have special graphics including machine readable graphics.

At 54 a plurality of substantially similar tickets are formed. The tickets may have the same data in the data region 18. The tickets may have different graphics including bar codes providing different information for each ticket. The tickets are then distributed at 56.

When the ticket is used it may be worn around the neck of the user based on the opening 28. The ticket may simply be held by the ticket holder. The tickets are checked (e.g. reviewed or inspected) at 58 to gain entry to an event or facility. The review or inspection may include breaking off the tab from the ticket and/or reading data from either the graphics region or data region of the ticket.

The holder of the ticket may read the data from the data region 18 by using a compact disk, CD-ROM, DVD or similar optical disk reader. As noted above, the process also preferably includes providing video, audio and/or multimedia as the data in the data region 18.

The compact disk or CD-ROM is cut using a machine controlled laser cutter. The laser is guided using a machine guiding procedure (machine controlled). The shape of the final perimeter is established with a computer control (using software) and then the shaping is carried out based on the predefined shape.

Graphic attributes of the disk are preferably provided prior to the cutting stage. The graphics attributes are preferably silk screened directly onto the disk using a 4 color process.

While specific embodiments of the invention have been shown and described in detail to illustrate the application of the principles of the invention, it will be understood that the invention may be embodied otherwise without departing from such principles.

What is claimed is:

1. A ticket/pass, comprising:

a cut optical disk forming a substantially planar structure with a substantially centrally disposed opening and a perimeter defined by at least one cut edge, the optical disk including an optically readable data region and a graphics region, said graphics region including ticket/pass information for regulating access to an event or facility and said data region including audio data and/or computer readable data, said at least one cut edge forming a substantially non-circular shape and said at least one cut edge forming a tab region and further comprising a hole cut in the optical disk at a distance from said cut edge to define breaking portions at each side of said hole cut in the optical disk at a distance from said cut edge to provide a breakaway tab at said tab region.

2. The ticket/pass according to claim 1, wherein said graphics region includes attributes having a shape and said at least one cut edge forms a shape corresponding to shape attributes of said graphics region.

3. The ticket/pass according to claim 1, wherein an eccentric opening is cut or punched in the optical disk for attaching a strap.

4. The ticket/pass according to claim 1 wherein said data region audio data and/or computer readable data is at least one of audio data, video data and multimedia data.

5. The ticket/pass according to claim 1, wherein said breakaway tab has a surface with said ticket/pass information for regulating access to an event or facility.

6. The ticket/pass according to claim 1, wherein said ticket/pass information for regulating access to an event or facility on said surface of said breakaway tab is machine readable information.

7. The ticket/pass according to claim 1, wherein said machine readable information is a bar code.

8. A ticket/pass, comprising:

a substantially planar disk with an optically readable data side and an opposite graphics side, said disk having a substantially centrally disposed opening and a perimeter defined by at least one cut edge to form a substantially non-circular ticket/pass, a graphics region on said opposite graphics side, said graphics region including shape attributes having a shape, said at least one cut edge having a shape corresponding to said shape attributes of said graphics region, said data side including data region said graphics region including ticket/pass information for regulating access to an event or facility and said data region including audio data and/or video data and/or computer readable data, an eccentric opening being cut or punched in the optical disk at a location spaced inwardly of said perimeter defined by said at least one cut edge, said hole defining a strap attachment opening, wherein said at least one cut edge forms a tab region and further comprising a hole cut in the disk, inwardly of said at least one cut edge to define breaking portions at each side of said hole, to form a breakaway tab at said tab region.

9. The ticket/pass according to claim 8, wherein said breakaway tab has a surface with said ticket/pass information for regulating access to an event or facility.

10. The ticket/pass according to claim 9, wherein said ticket/pass information for regulating access to an event or facility on said surface of said breakaway tab is machine readable information.

11. The ticket/pass according to claim 10, wherein said machine readable information is a bar code.

12. A ticket/pass, comprising:

a substantially planar disk with an optically readable data side and an opposite graphics side, said disk having a substantially centrally disposed opening and a perimeter defined by at least one cut edge to form a substantially non-circular ticket/pass, a graphics region including shape attributes having a shape, said at least one cut edge forming a shape corresponding to said shape attributes of said graphics region, said data side including a data region and said opposite side including said graphics region, said it least one cut edge forming a tab region and further comprising a hole cut in the optical disk at a distance from said cut edge to define breaking portions at each side of said hole cut in the optical disk to form a breakaway tab at said tab region, said breakaway tab having a surface with ticket/pass information for regulating access to an event or facility and said data region including audio data and/or video data and/or computer readable data.

13. The ticket/pass according to claim 12, wherein an eccentric opening is cut or punched in the optical disk for attaching a strap.

14. The ticket/pass according to claim 12, wherein said data region audio data and/or computer readable data is at least one of audio data, video data and multimedia data.

15. The ticket/pass according to claim 12, wherein said ticket/pass information for regulating access to an event or facility on said surface of said breakaway tab is machine readable information.

* * * * *